United States Patent
Antonio et al.

(10) Patent No.: US 10,949,218 B2
(45) Date of Patent: Mar. 16, 2021

(54) GENERATING AN EXECUTION SCRIPT FOR CONFIGURATION OF A SYSTEM

(71) Applicant: Accenture Global Solutions Limited, Dublin (IE)

(72) Inventors: Emmanuel Benbinuto Antonio, Mandaluyong (PH); Yvonne Jean Martinez, Negros Oriental (PH); Raye Willson Paez Raymundo, Cavite (PH); Donna Clarisse Lemence Calma, Metro Manila (PH); Marvin G. Tulagan, Manila (PH)

(73) Assignee: Accenture Global Solutions Limited, Dublin (IE)

( * ) Notice: Subject to any disclaimer, the term of this patent is extended or adjusted under 35 U.S.C. 154(b) by 547 days.

(21) Appl. No.: 15/960,009

(22) Filed: Apr. 23, 2018

(65) Prior Publication Data

US 2019/0324768 A1 Oct. 24, 2019

(51) Int. Cl.
| | |
|---|---|
| *G06F 9/445* | (2018.01) |
| *G06N 5/04* | (2006.01) |
| *G06N 20/00* | (2019.01) |
| *G06F 16/80* | (2019.01) |
| *H04L 12/58* | (2006.01) |
| *G06F 40/205* | (2020.01) |

(52) U.S. Cl.
CPC .......... *G06F 9/44505* (2013.01); *G06F 16/80* (2019.01); *G06N 5/04* (2013.01); *G06N 20/00* (2019.01); *G06F 40/205* (2020.01); *H04L 51/02* (2013.01)

(58) Field of Classification Search
CPC .......... G06N 20/00; G06N 5/04; H04L 51/02
See application file for complete search history.

(56) References Cited

U.S. PATENT DOCUMENTS

| | | | |
|---|---|---|---|
| 2003/0115078 A1 | 6/2003 | Young | |
| 2017/0154108 A1 | 6/2017 | Kraus et al. | |
| 2018/0299840 A1* | 10/2018 | Sinha | ..................... G05B 15/02 |
| 2020/0379989 A1* | 12/2020 | Milligan | ............. G06F 16/2428 |

FOREIGN PATENT DOCUMENTS

WO 2005043431 A2 5/2005

* cited by examiner

*Primary Examiner* — Terrell S Johnson
(74) *Attorney, Agent, or Firm* — Harrity & Harrity, LLP (57) ABSTRACT

A device may process configuration data to identify category data that identifies possible categories of data included in the configuration data. The device may process the category data, after identifying the category data, using a natural language processing technique to generate a set of terms to be processed using an artificial intelligence module. The device may utilize the artificial intelligence module to process the set of terms to predict a set of configuration actions to be performed with respect to the configuration data and to determine an order in which to perform the set of configuration actions. The artificial intelligence module may be associated with translating the configuration data into a computer-readable form. The device may generate an execution script based on the set of configuration actions or the order in which to perform the set of configuration actions. The device may perform the set of configuration actions.

20 Claims, 6 Drawing Sheets

GENERATING AN EXECUTION SCRIPT FOR CONFIGURATION OF A SYSTEM

BACKGROUND

An entity may plan resource usage and/or allocation using a software system. For example, the software system may be referred to as an enterprise resource planning (ERP) system. The ERP system may provide various software interfaces and components to perform key functions of the entity. One ERP system is the Software, Applications, and Products (SAP) ERP system.

SUMMARY

According to some possible implementations, a method may include receiving, by a device, configuration data to be used to configure a system. The configuration data may be in a human-readable form. The method may include processing, by the device, the configuration data to identify category data that identifies possible categories of data included in the configuration data after receiving the configuration data. The method may include processing, by the device and after identifying the category data, the category data using a natural language processing technique to generate a set of terms to be processed using an artificial intelligence module. The method may include utilizing, by the device, the artificial intelligence module to process the set of terms to predict a set of configuration actions to be performed with respect to the configuration data and to determine an order in which to perform the set of configuration actions. The artificial intelligence module may be associated with translating the configuration data from the human-readable form to a computer-readable form. The method may include generating, by the device, an execution script based on the set of configuration actions or the order in which to perform the set of configuration actions after utilizing the artificial intelligence module. The method may include performing, by the device, the set of configuration actions in the order after generating the execution script. The set of configuration actions may cause the system to be configured with the configuration data.

According to some possible implementations, a device may include one or more memories; and one or more processors, communicatively coupled to the one or more memories, to process attribute headers of configuration data to identify category data that identifies possible categories of data included in the configuration data. The configuration data may be used to configure a system. The configuration data may be in a tabular format. The attribute headers may be column headers or row headers of the tabular format. The one or more processors may process the category data, after identifying the category data, using a natural language processing technique to generate a set of terms to be processed using an artificial intelligence module. The one or more processors may utilize the artificial intelligence module to process the set of terms to predict a set of configuration actions to be performed with respect to the configuration data and to determine an order in which to perform the set of configuration actions. The one or more processors may generate an execution script based on the set of configuration actions or the order in which to perform the set of configuration actions after utilizing the artificial intelligence module. The one or more processors may perform the set of configuration actions in the order after generating the execution script. The set of configuration actions may cause the system to be configured with the configuration data.

According to some possible implementations, a non-transitory computer-readable medium may store one or more instructions that, when executed by one or more processors, cause the one or more processors to process configuration data to identify category data that identifies possible categories of data included in the configuration data. The configuration data may be used to configure a system. The one or more instructions, when executed by the one or more processors, may cause the one or more processors to process the category data, after identifying the category data, using a natural language processing technique to generate a set of terms to be processed using an artificial intelligence module. The one or more instructions, when executed by the one or more processors, may cause the one or more processors to utilize the artificial intelligence module to process the set of terms to predict a set of configuration actions to be performed with respect to the configuration data and to determine an order in which to perform the set of configuration actions. The artificial intelligence module may be associated with translating the configuration data into a computer-readable form. The one or more instructions, when executed by the one or more processors, may cause the one or more processors to generate an execution script based on the set of configuration actions or the order in which to perform the set of configuration actions after utilizing the artificial intelligence module. The one or more instructions, when executed by the one or more processors, may cause the one or more processors to perform the set of configuration actions in the order after generating the execution script. The set of configuration actions may cause the system to be configured with the configuration data.

DETAILED DESCRIPTION

The following detailed description of example implementations refers to the accompanying drawings. The same reference numbers in different drawings may identify the same or similar elements.

An entity (e.g., an organization, an individual, a governmental entity, and/or the like) may use an ERP system to perform functions of the entity, such as operations, financials, human capital management, and/or corporate services. For example, the ERP system may handle data collection, data storage, and/or data management, associated with these functions. The ERP system may provide an integrated and continuously updated view of core business processes using common databases maintained by a database management system. One ERP system is the SAP ERP system.

To configure an ERP system (e.g., to perform particular processes, with updated data, and/or the like), an individual may have to be trained to map processes of an organization to particular configuration actions and portions of the ERP system. For example, for the SAP ERP system, the individual may have to be trained to map processes of an organization and transaction codes associated with the SAP ERP system to be capable of configuring the SAP ERP system. This consumes a significant amount of time, can be error prone, and can consume computing resources of the ERP system due to errors in the configuration, and/or the like. In addition, there currently does not exist a tool for configuring an ERP system automatically and/or in an efficient manner.

Some implementations described herein provide a system configuration platform that is capable of gathering millions, billions, or more data elements related to configuring hundreds, thousands, or more ERP systems and/or hundreds, thousands, or more portions of the ERP systems and configuring the ERP systems according to the data elements. In this way, the system configuration platform provides a tool that can be used to automatically and efficiently configure one or more ERP systems. This reduces or eliminates errors that could otherwise occur during configuration of an ERP system. In addition, this reduces an amount of time needed to configure an ERP system, thereby improving the process of configuring the ERP system. Further, this conserves processing resources that would otherwise be consumed due to errors during the configuration process, due to inefficient manual configuration, and/or the like. Further, this provides a tool that can be used to simultaneously configure different systems for different organizations, which was not previously possible, that can reduce an amount of skill needed to configure an ERP system, and/or the like.

In addition, in this way, several different stages of the process for configuring an ERP system are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to configure an ERP system (or multiple ERP systems) in a quick and efficient manner. Further, automating the process for configuring an ERP system conserves computing resources (e.g., processor resources, memory resources, and/or the like) that would otherwise be wasted performing an inaccurate and/or untimely manual configuration.

Figure 1A:
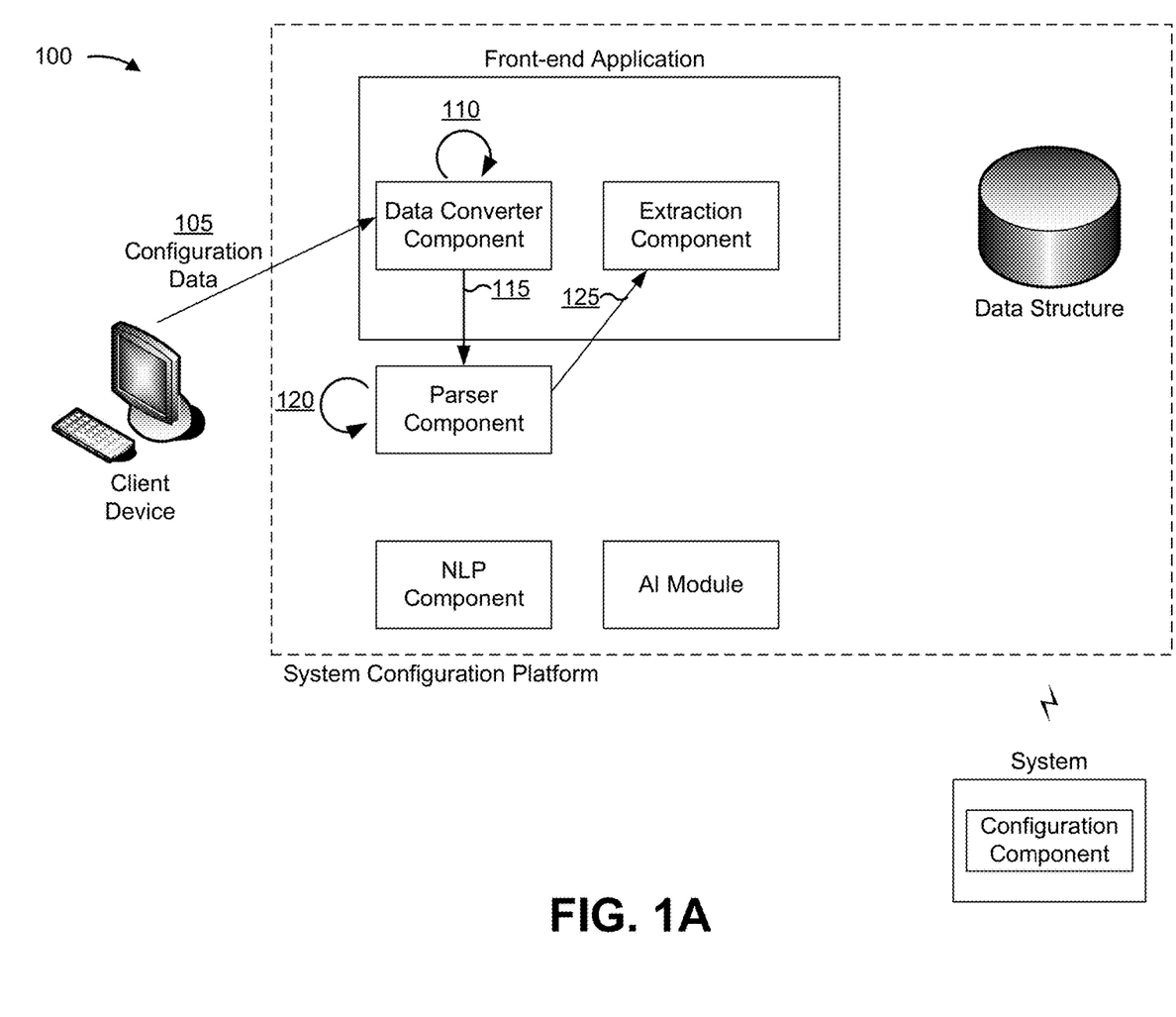
FIGS. 1A-1C are diagrams of an overview of an example implementation described herein.
Figure 1B:
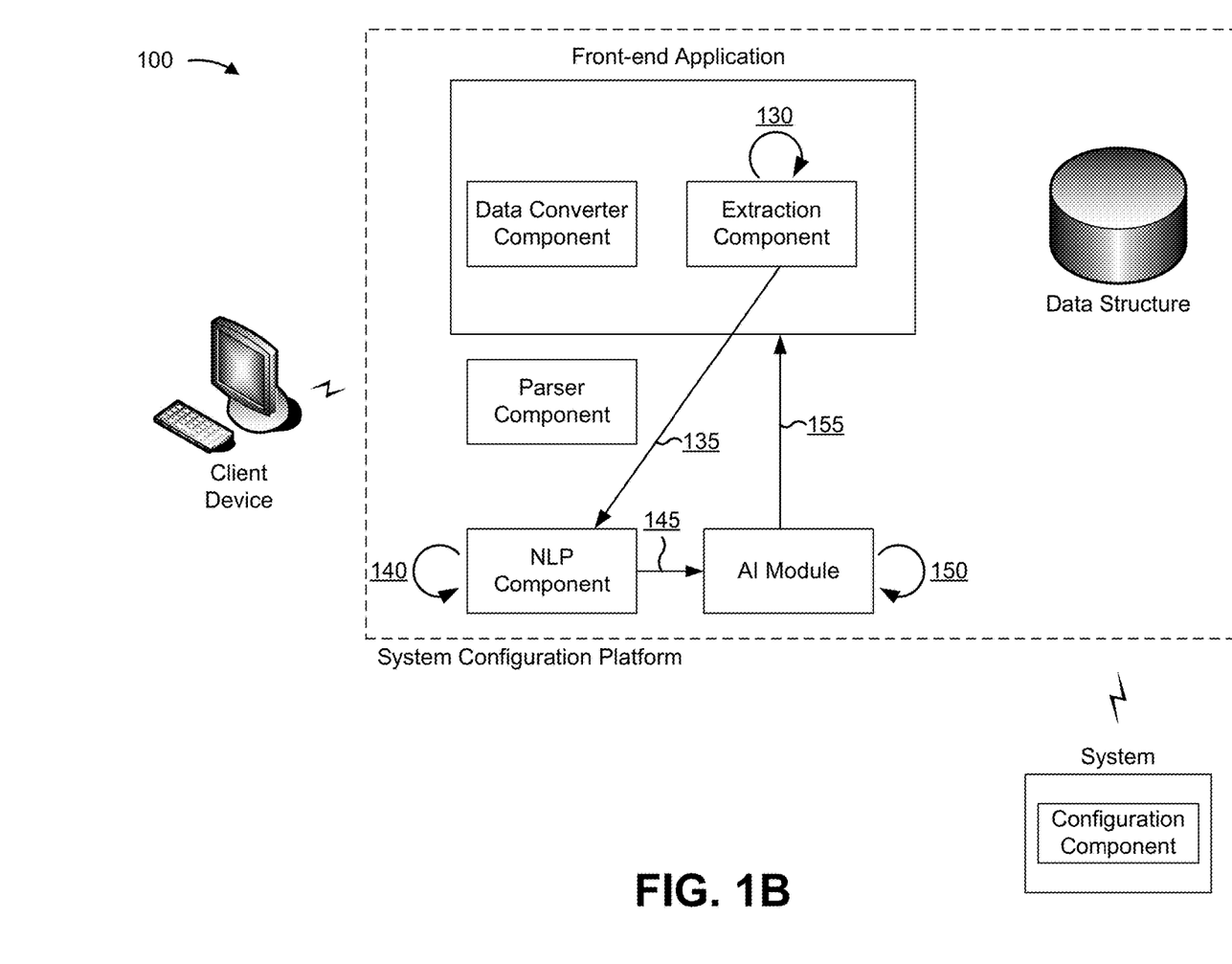
Figure 1C:
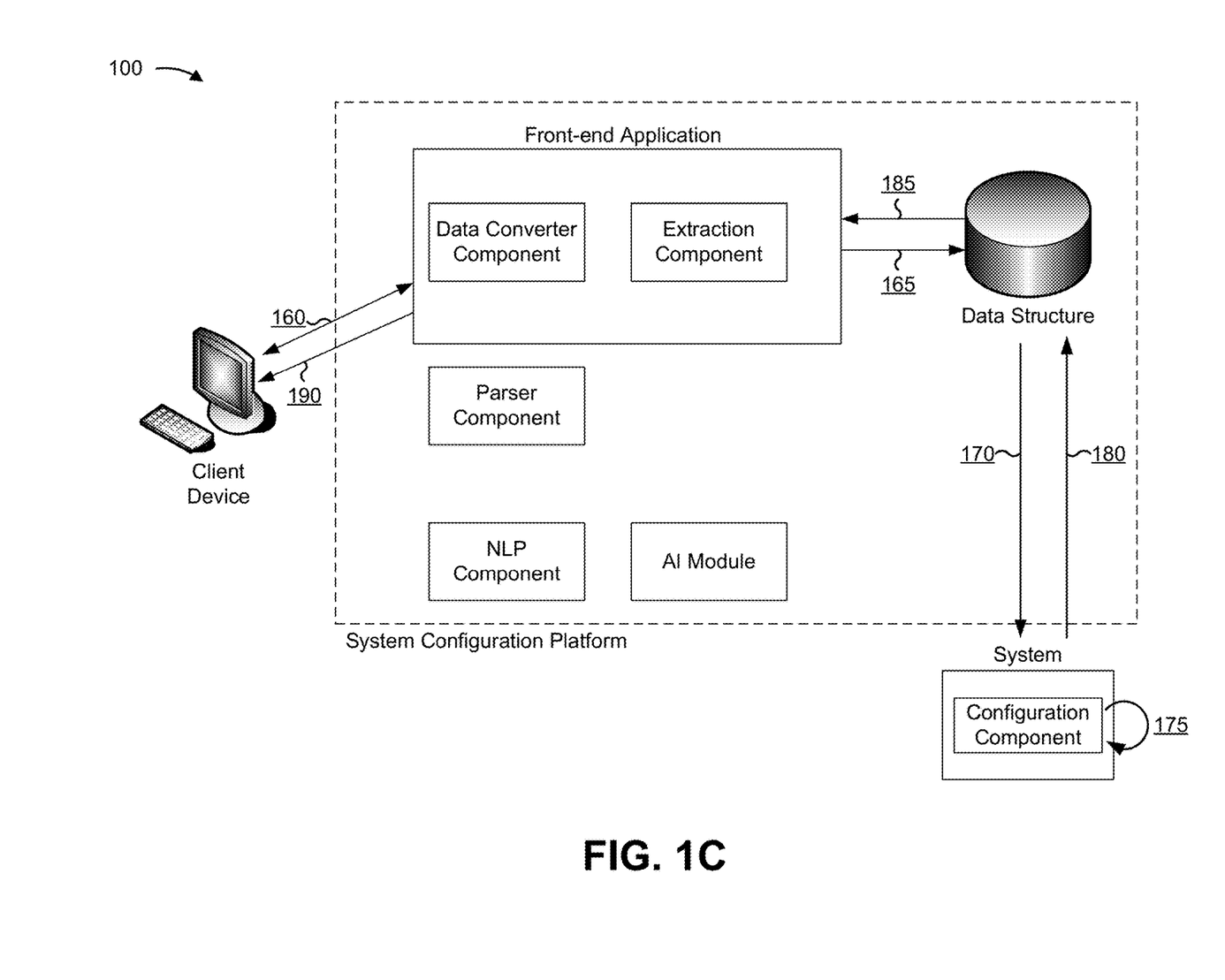

FIGS. 1A-1C are diagrams of an overview of an example implementation 100 described herein. As shown in FIG. 1A, implementation 100 includes a client device, a system (e.g., an ERP system, such as an SAP ERP system) that includes a configuration component, and a system configuration platform. For example, the system configuration platform may include a data converter component, an extraction component, a parser component, a natural language processing (NLP) component, an artificial intelligence (AI) module, and a data structure.

As shown by reference number 105, the system configuration platform may receive configuration data from the client device. In some implementations, configuration data may be related to configuring the system. For example, for an ERP system, the configuration data may include an updated bill of materials for a product produced by an organization, updated customer information for customers of the organization, updated supplier information for suppliers of the organization, updated product offerings associated with a supplier, updated employee information for employees of the organization, and/or the like. As a specific example, and for an updated bill of materials, the configuration data may include material identifiers that identify materials included in the updated bill of materials, descriptions for the materials included in the updated bill of materials, a unit of measure for the materials included in the bill of materials, and/or the like. In some implementations, configuration data may include millions, billions, or more data elements. In addition, the system configuration platform may receive configuration data for hundreds, thousands, or more ERP systems. In this way, the system configuration platform can receive a data set that cannot be processed manually or objectively (e.g., in a consistent manner) by a human actor. In addition, in this way, the system configuration platform may receive a data set to be used to configure a set of ERP systems that could not be configured in an efficient manner by a human actor.

In some implementations, the configuration data may be in a tabular format (e.g., may include rows and columns). In some implementations, the system configuration platform may receive the configuration data via a front-end application (e.g., that includes SAP UI5 in the context of an SAP ERP system) and/or utilizing the data converter component. In some implementations, the configuration data may be in the form of a spreadsheet file, a comma-separate values (CSV) file, and/or the like. In some implementations, the configuration data may include attribute headers for attributes included in the configuration data. For example, a row header or column header (e.g., an attribute header) in the configuration data may include information identifying the types of values (e.g., attributes) included in a corresponding row or column of the configuration data. In some implementations, the configuration data may be in a human-readable format and/or in a format that is different than what is needed to configure the system.

In some implementations, the system configuration platform may receive the configuration data when a user of the client device uploads the configuration data (e.g., via the front-end application associated with the system configuration platform). For example, a user of the client device may upload the configuration data via a user interface associated with the front-end application and provided for display via a display associated with the client device. Additionally, or alternatively, the system configuration platform may receive the configuration data via a user interaction with a chat bot associated with the system configuration platform. For example, the user of the client device may interact with the chat bot via a user interface provided for display via a display associated with the client device to upload the configuration data. In this way, the system configuration platform provides an interactive way for a user of the client device to upload the configuration data.

As shown by reference number 110, the system configuration platform may utilize the data converter component to process the configuration data. For example, the system configuration platform may utilize the data converter component to process a spreadsheet file, a CSV file, and/or the like. In some implementations, the system configuration platform may convert the configuration data to a base64 format (e.g., into a base64 file). In some implementations, the system configuration platform may process the configuration data after receiving the configuration data, based on receiving input from the user of the client device to process the configuration data, periodically, according to a schedule, based on providing a set of instructions to the data converter component, and/or like.

As shown by reference number 115, the system configuration platform may provide the configuration data (e.g., in the base64 format) from the data converter component to the parser component. For example, the system configuration platform may provide a set of instructions to the data converter component to cause the data converter component to provide the configuration data to the parser component. Additionally, or alternatively, and as another example, the data converter component may provide the configuration data to the parser component automatically after converting the configuration data into the base 64 format, based on receiving a request for the configuration data from the parser component, and/or the like.

As shown by reference number 120, the system configuration platform may utilize the parser component to process the configuration data. For example, the system configuration platform may utilize the parser component to process the base64 format of the configuration data. In some implementations, the system configuration platform may parse the configuration data (e.g., the base64 format of the configuration data) into a JavaScript Object Notation (JSON) file. In some implementations, parsing the configuration data into the JSON file may facilitate easier and quicker processing of the configuration data at later stages of processing and/or may place the configuration data into a format that can be used with various different operating systems, programming languages, and/or the like. In some implementations, the system configuration platform may cause the parser component to process the configuration data by providing a set of instructions to the parser component. Additionally, or alternatively, the parser component may process the configuration data automatically after receiving the configuration data from the data converter component, periodically, according to a schedule, automatically based on receiving the configuration data, and/or the like.

As shown by reference number 125, the system configuration platform may provide the configuration data (e.g., the JSON file of the configuration data) from the parser component to the extraction component. For example, the system configuration platform may cause the parser component to provide the configuration data to the extraction component by providing a set of instructions to the parser component. Additionally, or alternatively, and as another example, the parser component may provide the configuration data to the extraction component automatically after parsing the configuration data, after receiving a request for the configuration data from the parser component, periodically, according to a schedule, and/or the like.

Turning to FIG. 1B, and as shown by reference number 130, the system configuration platform may utilize the extraction component to process the configuration data. For example, the system configuration platform may utilize the extraction component to process the JSON file of the configuration data. In some implementations, the system configuration platform may provide a set of instructions to the extraction component to cause the extraction component to process the configuration data. Additionally, or alternatively, the extraction component may automatically process the configuration data based on receiving the configuration data from the parser component, periodically, according to a schedule, and/or the like.

In some implementations, the system configuration platform may utilize the extraction component to process attribute headers of the configuration data to identify category data included in the configuration data. For example, the system configuration platform may process the configuration data to extract column headers from the JSON file. In some implementations, the system configuration platform may identify attribute headers by identifying a delimiter (e.g., a comma in a CSV file) in the configuration data, utilizing metadata associated with the configuration data to identify a structure of the configuration data (e.g., a structure of columns, row, and/or headers), and/or the like.

In some implementations, the category data may identify categories (or possible categories) of data included in the configuration data. For example, for configuration data that relates to customers of an organization, the category data may identify categories of data (e.g., attribute headers) such as "customer name," "customer address," "customer identifier," and/or the like. In some implementations, the system configuration platform may identify the category data to identify possible configuration steps needed to configure the system, as described elsewhere herein. For example, the configuration steps needed to configure the system may depend on the categories of data included in the configuration data.

In some implementations, the system configuration platform may output the identified category data for display via a display associated with the client device. For example, the system configuration platform may utilize the front-end application to output the category data and/or may utilize a chat bot to output the category data. In some implementations, the output provided to the client device may request input as to whether the identified category data is accurate and/or may permit the user of the client device to modify the category data identified by the system configuration platform. For example, the user of the client device may modify the category data (e.g., may add a category, remove a category, modify a name for a category, and/or the like) via a user interface associated with the front-end application, via the chat bot, and/or the like and the system configuration platform may update the category data based on any modifications to the category data.

In some implementations, the system configuration platform may utilize information identifying the modifications to the category data and/or resulting categories based on the modifications as a training set of data for a machine learning model associated with the extraction component. For example, the training set of data may be used to train the machine learning model to identify category data in the future in an improved manner.

As shown by reference number 135, the system configuration platform may provide the category data from the extraction component to the NLP component. For example, the system configuration platform may cause the extraction component to provide the category data (e.g., to provide the JSON file with the category data) to the NLP component by providing a set of instructions to the extraction component, based on receiving input from the client device to cause the extraction component to provide the category data to the NLP component, and/or the like. Additionally, or alternatively, and as another example, the extraction component may provide the category data to the NLP component automatically after extracting the category data, based on receiving a request from the NLP component, and/or the like.

As shown by reference number 140, the system configuration platform may utilize the NLP component to process the category data. For example, the system configuration platform may utilize the NLP component to process the category data (e.g., to process the JSON file with the category data) to identify a set of terms included in the category data, another set of terms associated with the set of terms included in the category data, and/or the like. Continuing with the previous example, the NLP component may use a text processing technique, such as a natural language processing technique, a computational linguistics technique, and/or the like to identify a set of terms that can be mapped to configuration steps by the AI module (e.g., by identifying terms that are included in both the category data and the other set of terms that is mapped to the configuration steps, by identifying terms included in the other set of terms that are similar to terms included in the set of terms identified in the category data, and/or the like). In this way, the system configuration platform can translate category data identified in configuration data into a format that can be used to predict a set of configuration steps associated with configuring the system with the configuration data, as described elsewhere herein.

In some implementations, the system configuration platform may utilize the NLP component for another purpose. For example, the system configuration platform may utilize the NLP component to correct spelling errors identified in category data, to apply a standard formatting to the category data, and/or the like. This conserves processing resources that would otherwise be consumed due to an error if the category data was not processed using the natural language component.

As shown by reference number 145, the system configuration platform may provide information identifying the set of terms included in the category data from the NLP component to the AI module. For example, the system configuration platform may cause the NLP component to provide the information identifying the set of terms to the AI module by providing a set of instructions to the NLP component, based on receiving input from the client device to cause the NLP component to provide the information to the AI module, and/or the like. Additionally, or alternatively, and as another example, the NLP component may provide the information to the AI module automatically after identifying the set of terms, based on receiving a request from the AI module, and/or the like.

As shown by reference number 150, the system configuration platform may utilize the AI module to predict a set of configuration steps associated with the set of terms and/or an order in which to perform the set of configuration steps. For example, the system configuration platform may utilize the AI module to process information identifying the set of terms identified from the category data to predict the set of configuration steps and/or the order in which to perform the set of configuration steps. In some implementations, a configuration step may include a step related to configuring the system with the configuration data. For example, a configuration step may identify a particular data structure, a sub-system of the system, and/or the like to be configured that is associated with the category data. In the context of an SAP ERP system, the AI module may identify transaction codes for the category data included in the JSON file (e.g., based on column names included in the JSON file).

In some implementations, the AI module may have been trained to predict the set of configuration steps. For example, the AI module may have been trained on a training set of data that identifies various sets of terms and corresponding configuration steps. In this way, the AI module may be configured such that the AI module can receive a new set of terms and can identify corresponding configuration steps for the new set of terms. This provides the system configuration platform with a capability to configure a system using data sets that are too large for a human actor, that are too complex to be used by the human actor (even when assisted by a computerized tool), and/or the like. This improves functioning of the system configuration platform by reducing or eliminating a need for human intervention in configuring a system. In the context of an SAP ERP system, the system configuration platform may utilize the AI module to identify transaction codes for category data identified in the configuration data in a similar manner.

In some implementations, the AI module may perform a lookup to identify a set of configuration steps to perform. For example, the AI module may perform a lookup of terms included in the set of terms and may identify a corresponding set of configuration steps to perform. In some implementations, in the context of an SAP ERP system, the AI module may perform a lookup to identify transaction codes associated with category data identified in the configuration data in a similar manner.

In some implementations, the AI module may determine an order for the set of configuration steps in a similar manner. For example, the AI module may have been trained on a training set of data to identify the order of the set of configuration steps. Additionally, or alternatively, and as another example, the AI module may perform a lookup of information identifying the set of configuration steps to identify the order of the set of configuration steps. In some implementations, in the context of an SAP ERP system, the AI module may determine an order in which a set of transaction codes identified for the category data is to be performed to configure the system with the configuration data in a similar manner. In some implementations, the AI module may generate an execution script. For example, the AI module may generate a file that includes information identifying the set of configuration steps (or transaction codes in an SAP ERP system), the order for the set of configuration steps (or the order for a set of transaction codes for an SAP ERP system), and/or the like. Continuing with the previous example, the execution script may be in a computer-readable format (e.g., a format that the configuration component can process to execute the execution script).

In some implementations, the AI module may output information for display that identifies the execution script and/or the configuration steps of the execution script to permit confirmation of the execution script. For example, the AI module may request, via a user interface and/or a chat bot provided for display via the client device, confirmation of the execution script by a user of the client device so that any errors in the execution script are identified prior to executing the execution script. This conserves processing resources that would otherwise be consumed due to an error in the execution script. In some implementations, if the AI module cannot predict all configuration steps of the execution script (e.g., due to incomplete configuration data, due to an error during use of the text processing technique, and/or the like), then the AI module may predict the configuration steps based on being trained (e.g., on a training set of data that includes incomplete configuration data and corresponding configuration steps) and may request confirmation of the execution script via the client device in a manner similar to that described above. For example, a user of the client device may indicate via a user interface, whether the predicted configuration steps of the execution script are correct for the configuration data. In some implementations, if the user indicates that the generated execution script is incorrect, the AI module may perform another prediction of configuration steps and may generate another execution script for review by a user of the client device. In some implementations, the AI module may use this information as training data for a machine learning model to improve future generation of execution scripts. This improves prediction of configuration steps for an execution script when configuration data is incomplete, when the configuration data includes an error, when the text processing by the NLP component includes an error, and/or the like. Further, this facilitates training of the AI module to identify mandatory and optional attributes in configuration data.

As shown by reference number 155, the system configuration platform may provide information identifying the set of configuration steps and/or the order in which to perform the set of configuration steps from the AI module to the front-end application of the system configuration platform. For example, the system configuration platform may cause the AI module to provide the information to the front-end application by providing a set of instructions to the AI module, based on receiving input from the client device to cause the AI module to provide the information to the front-end application, and/or the like. Additionally, or alternatively, and as another example, the AI module may provide the information to the front-end application automatically after identifying the set of terms, based on receiving a request from the AI module, and/or the like.

In some implementations, and in the context of an SAP ERP system, the AI module may provide identified transaction codes for the JSON file to the front-end application. In this case, the front-end application may provide the transaction codes for display via the client device, similar to what is described with regard to reference number 160 below. Additionally, or alternatively, the front-end application may format the JSON file by including the transaction codes in the JSON file.

Turning to FIG. 1C, and as shown by reference number 160, the system configuration platform may utilize the front-end application to communicate with the client device. For example, the system configuration platform may provide information identifying the execution script for display via a user interface, a chat bot, and/or the like associated with the client device. In some implementations, the system configuration platform may request, from the user of the client device, confirmation of the set of configuration steps and/or the order of the set of configuration steps. Additionally, or alternatively, the system configuration platform may permit the user to modify the execution script. In some implementations, if the user of the client device inputs a modification to the execution script, the system configuration platform may accordingly modify the execution script and/or may use the input as a training set of data for the AI module. This improves future identification of a set of configuration steps and/or the order of the set of configuration steps.

As shown by reference number 165, the system configuration platform may store the execution script in a data structure. For example, the system configuration platform may store the execution script in a data structure that is accessible by the system to be configured. In the context of an SAP ERP system, the front-end application may store a JSON file for the execution script in SAP Hana.

In some implementations, the data structure may process the execution script. For example, the data structure may map the execution script (or configuration data) to program code to be used configure the system, to identifiers that are particular to the system to be configured, to particular sub-systems of the system, and/or the like. As a specific example, the data structure may map customer numbers for various customers included in the configuration data to the actual system-level identifiers for the various customers used by the system (e.g., using information that identifies a mapping between category data and the system).

In the context of an SAP ERP system, the system configuration platform may utilize SAP Hana to map non-technical fields of the JSON to technical fields per transaction code. For example, the system configuration platform may utilize SAP Hana to map column headers included in the JSON file to system-level identifiers used in the SAP ERP system. Additionally, or alternatively, the system configuration platform may utilize SAP Hana to map data in the JSON file to a batch data communication structure associated with the SAP ERP system.

As shown by reference number 170, the execution script and/or the configuration data may be provided to the system (e.g., to the configuration component associated with the system). For example, the system configuration platform may provide the execution script and/or the configuration data from the data structure to the system based on receiving a request for the execution script and/or the configuration data from the system (e.g., from the configuration component), based on receiving input from a user of the client device to provide the execution script and/or the configuration data, and/or the like.

In the context of an SAP ERP system, the system configuration platform may utilize SAP Hana XS JavaScript (XSJS) to provide a payload to the SAP ERP system. For example, the system configuration platform may provide the JSON file to the SAP ERP system utilizing XSJS.

As shown by reference number 175, the configuration component may configure the system. For example, the configuration component may execute the execution script to configure the system with the configuration data. In some implementations, by executing the execution script, the configuration component may populate various data structures with the configuration data, may configure particular settings for the system, and/or the like. In some implementations, the configuration component may be associated with the system configuration platform. For example, the configuration component may be configured to communicate with both the system configuration platform and the system to be configured.

In the context of an SAP ERP system, the configuration component may utilize advanced business application programming open data (ABAP OData). In some implementations, the configuration component may utilize ABAP OData to process the payload from the system configuration platform into a batch data communication-like table structure. Additionally, or alternatively, the configuration component may sort configuration data according to the batch data communication structure. Additionally, or alternatively, the configuration component may execute the batch data communication structure into a corresponding transaction code.

As shown by reference number 180, the configuration component may provide configuration results to the system configuration platform (e.g., to the data structure). In some implementations, the configuration component may provide the configuration results after configuring the system, in real-time (or near real-time), during configuration of the system, and/or the like. In some implementations, the configuration results may identify whether the configuration was successful, a progress of the configuration (e.g., a percentage of the configuration complete, an amount of time remaining to configure the system, and/or the like), a current configuration step being performed by the configuration component, whether any issues are occurring during configuration of the system, and/or the like. In some implementations, and in the context of an SAP ERP system, the configuration component may provide configuration results to SAP Hana associated with the system configuration platform.

In some implementations, the system configuration platform may store the configuration results in the data structure.

For example, the system configuration platform may store the configuration results in a log of configurations performed on different systems, for the system, and/or the like.

As shown by reference numbers 185 and 190, the system configuration platform may output the configuration results to the client device for display. For example, the system configuration platform may output the configuration results after configuration of the system is complete, in real-time (or near real-time), and/or the like.

In some implementations, the system configuration platform may perform error handling for the configuration. For example, the configuration component may send a message to the system configuration platform indicating that an error has occurred and the system configuration platform may handle the error by re-providing configuration data to the configuration component, by triggering an alarm related to the error, by outputting a message to the client device indicating that an error has occurred, by generating a new or modified execution script, and/or the like. Additionally, or alternatively, the system configuration platform may generate a report related to configuration of the system (e.g., that includes information identifying that the system that was configured, configuration results related to configuring the system, and/or the like).

In this way, the system configuration platform may automatically and intelligently configure a system. This conserves computing resources that would otherwise be consumed through a less efficient configuration of the system. In addition, this provides a previously unavailable tool that can be used to configure hundreds, thousands, or more systems. Further, this increases an accuracy of configuring a system, thereby conserving processing resources that would otherwise be consumed due to inaccurately configuring the system. Further, this reduces or eliminates a need to train an individual to configure the system, thereby conserving resources associated with training the individual.

As indicated above, FIGS. 1A-1C are provided merely as an example. Other examples are possible and may differ from what was described with regard to FIGS. 1A-1C.

Figure 2:
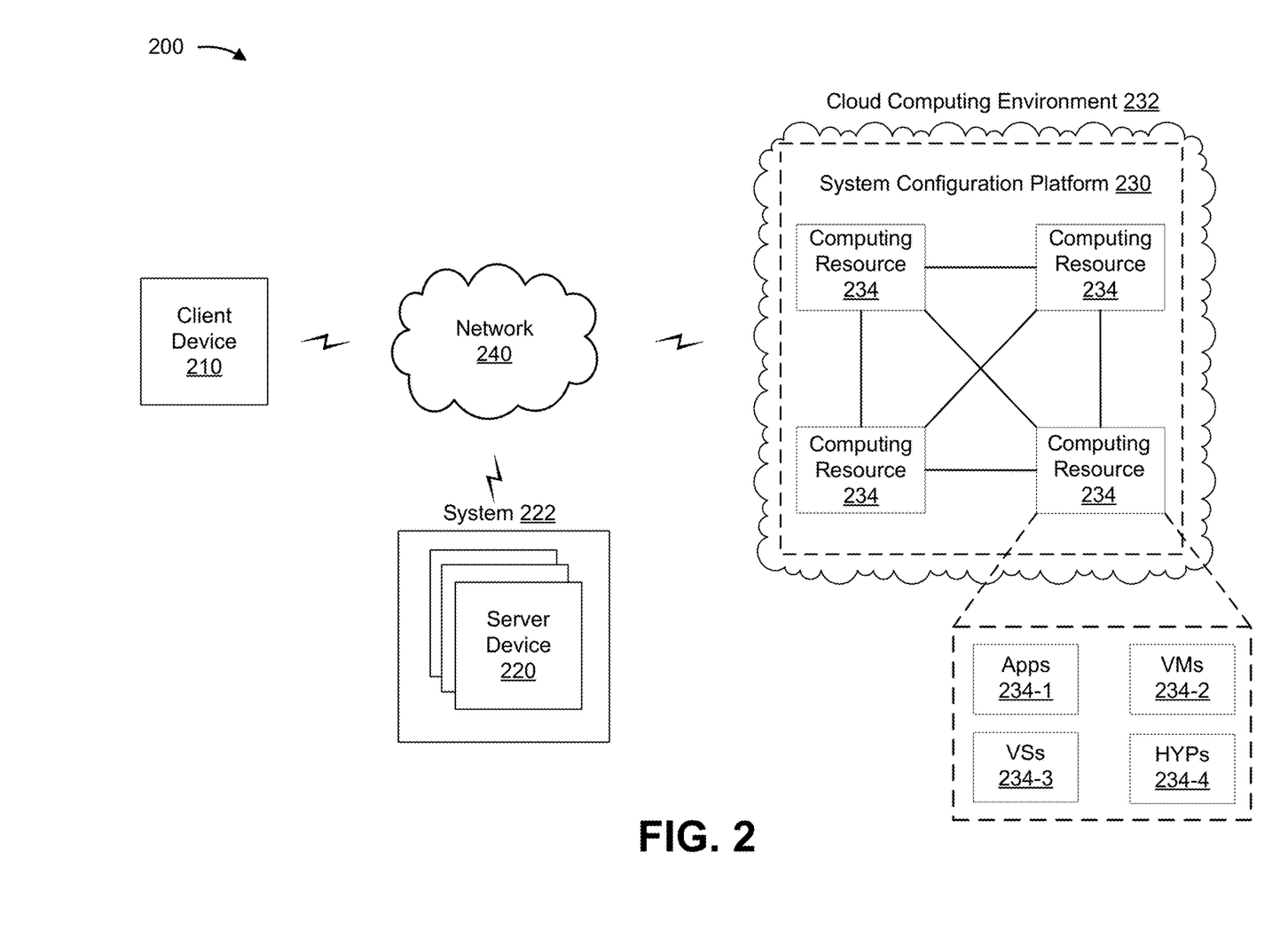
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a set of server devices 220 (e.g., referred to collectively as "server devices 220" and individually as "server device 220") in a system 222, a system configuration platform 230 hosted in a cloud computing environment 232 that includes a set of computing resources 234 (e.g., referred to collectively as "computing resource 234" and individually as "computing resource 234"), and a network 240. Devices of environment 200 may interconnect via wired connections, wireless connections, or a combination of wired and wireless connections.

Client device 210 includes one or more devices capable of receiving, generating, storing, processing, and/or providing information associated with configuring a system. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 210 may provide, to system configuration platform 230, configuration data to be used to configure a system, as described in more detail elsewhere herein. Additionally, or alternatively, client device 210 may receive, from system configuration platform 230, configuration results related to configuring a system, as described in more detail elsewhere herein.

Server device 220 includes one or more devices capable of receiving, generating storing, processing, and/or providing information associated with configuring a system. For example, server device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may be a physical device implemented within a housing, such as a chassis. In some implementations, server device 220 may be a virtual device implemented by one or more computer devices of a cloud computing environment or a data center. In some implementations, server device 220 may store an execution script, configuration results, and/or the like, as described elsewhere herein.

In some implementations, a set of server devices 220 may form system 222. In some implementations, system 222 may be associated with operations of an organization. For example, system 222 may include an ERP system, a billing system, a customer resource management (CRM) system, and/or the like. In some implementations, system configuration platform 230 may configure system 222 (e.g., a set of server devices 220 of system 222) with configuration data, as described elsewhere herein.

System configuration platform 230 includes one or more devices capable of receiving, generating, storing, processing, and/or providing information associated with configuring a system. For example, system configuration platform 230 may include a cloud server or a group of cloud servers. In some implementations, system configuration platform 230 may be designed to be modular such that certain software components can be swapped in or out depending on a particular need. As such, system configuration platform 230 may be easily and/or quickly reconfigured for different uses.

In some implementations, as shown, system configuration platform 230 may be hosted in cloud computing environment 232. Notably, while implementations described herein describe system configuration platform 230 as being hosted in cloud computing environment 232, in some implementations, system configuration platform 230 may not be cloud-based (i.e., may be implemented outside of a cloud computing environment) or may be partially cloud-based.

Cloud computing environment 232 includes an environment that hosts system configuration platform 230. Cloud computing environment 232 may provide computation, software, data access, storage, and/or other services that do not require end-user knowledge of a physical location and configuration of a system and/or a device that hosts system configuration platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host system configuration platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with system configuration platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
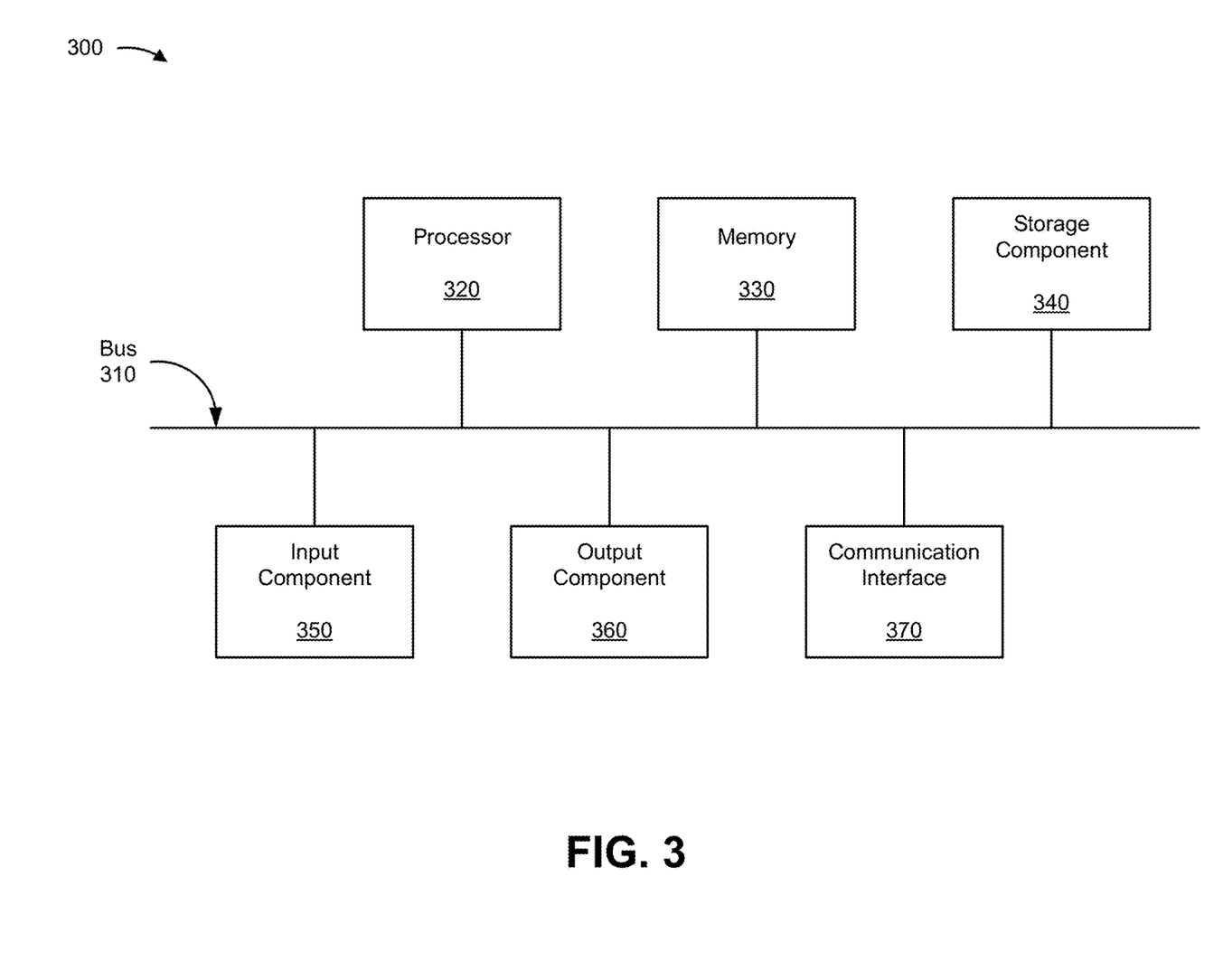
FIG. 3 is a diagram of example components of one or more devices of FIG. 2.

FIG. 3 is a diagram of example components of a device 300. Device 300 may correspond to client device 210, server device 220, system 222, system configuration platform 230, and/or computing resource 234. In some implementations, client device 210, server device 220, system 222, system configuration platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
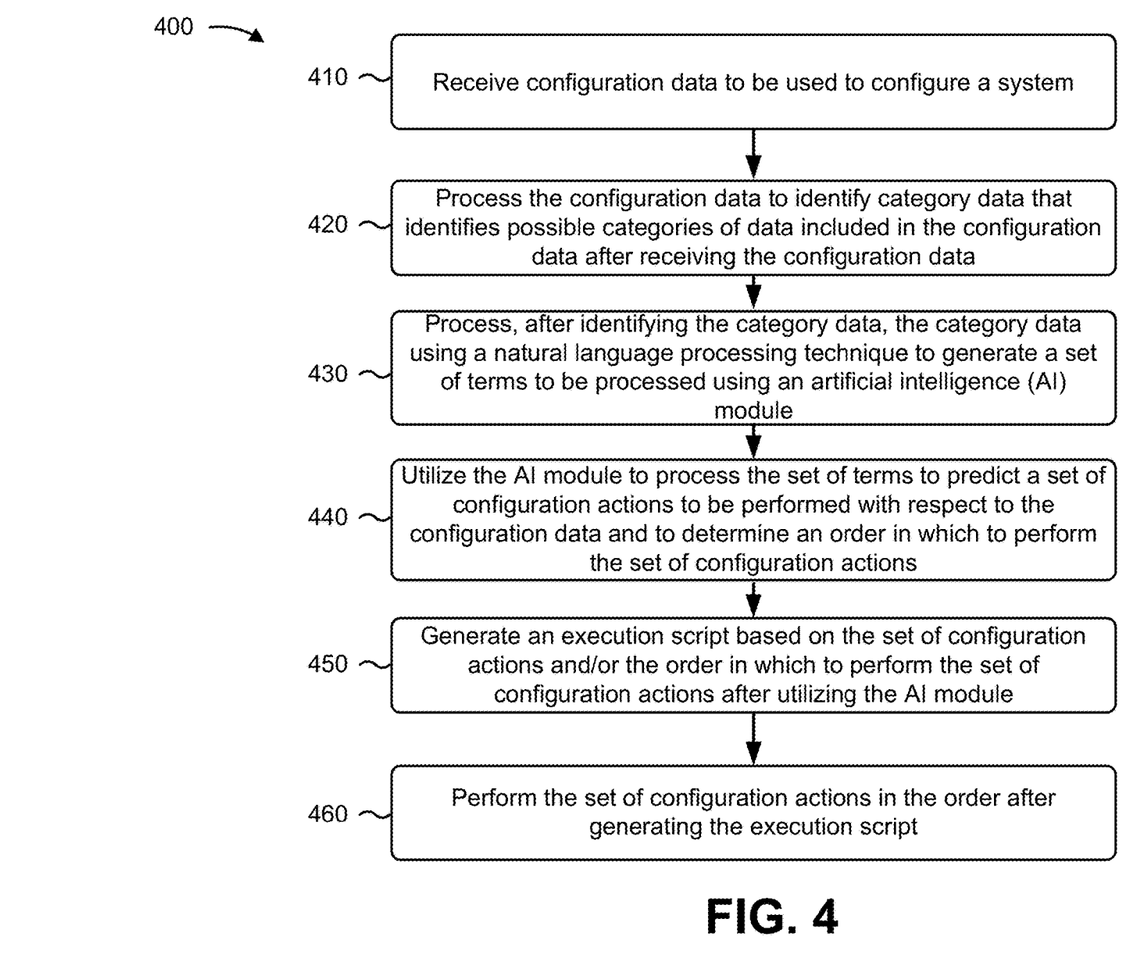
FIG. 4 is a flow chart of an example process for generating an execution script for configuration of a system.

FIG. 4 is a flow chart of an example process 400 for generating an execution script for configuration of a system. In some implementations, one or more process blocks of FIG. 4 may be performed by a system configuration platform (e.g., system configuration platform 230). In some implementations, one or more process blocks of FIG. 4 may be performed by another device or a group of devices separate from or including the system configuration platform, such as a client device (e.g., client device 210), a server device (e.g., server device 220), a system (e.g., system 222), and a computing resource (e.g., computing resource 234).

As shown in FIG. 4, process 400 may include receiving configuration data to be used to configure a system (block 410). For example, the system configuration platform (e.g., using a data converter component, computing resource 234, processor 320, memory 330, input component 350, communication interface 370, and/or the like) may receive configuration data to be used to configure a system.

In some implementations, the system configuration platform may receive configuration data in a manner that is the same as or similar to that described with regard to FIGS. 1A-1C. For example, the system configuration platform may receive the configuration data via a chat bot associated with the system configuration platform.

As further shown in FIG. 4, process 400 may include processing the configuration data to identify category data that identifies possible categories of data included in the configuration data after receiving the configuration data (block 420). For example, the system configuration platform (e.g., using the data converter component, a parser component, an extraction component, computing resource 234, processor 320, and/or the like) may process the configuration data to identify category data that identifies possible categories of data included in the configuration data after receiving the configuration data.

In some implementations, the system configuration platform may process the configuration data in a manner that is the same as or similar to that described with regard to FIGS. 1A-1C. For example, the system configuration platform may process the configuration data to identify attribute headers (e.g., column headers and/or row headers) included in the configuration data.

As further shown in FIG. 4, process 400 may include processing, after identifying the category data, the category data using a natural language processing technique to generate a set of terms to be processed using an artificial intelligence (AI) module (block 430). For example, the system configuration platform (e.g., using an NLP component, computing resource 234, processor 320, and/or the like) may process, after identifying the category data, the category data using a natural language processing technique to generate a set of terms to be processed using an AI module.

In some implementations, the system configuration platform may process the category data in a manner that is the same as or similar to that described with regard to FIGS. 1A-1C. For example, the system configuration platform may process the category data (e.g., attribute headers) to identify a set of terms included in the category data, to correct misspellings in the category data, and/or the like.

As further shown in FIG. 4, process 400 may include utilizing the AI module to process the set of terms to predict a set of configuration actions to be performed with respect to the configuration data and to determine an order in which to perform the set of configuration actions (block 440). For example, the system configuration platform (e.g., using computing resource 234, processor 320, and/or the like) may utilize the AI module to process the set of terms to predict a set of configuration actions to be performed with respect to the configuration data and to determine an order in which to perform the set of configuration actions.

In some implementations, the system configuration platform may utilize the AI module in a manner that is the same as or similar to that described with regard to FIGS. 1A-1C. For example, the system configuration platform may utilize the AI module to identify a set of configuration steps based on the column headers and/or the row headers included in the configuration data.

As further shown in FIG. 4, process 400 may include generating an execution script based on the set of configuration actions and/or the order in which to perform the set of configuration actions after utilizing the AI module (block 450). For example, the system configuration platform (e.g., using the extraction component, computing resource 234, processor 320, and/or the like) may generate an execution script based on the set of configuration actions and/or the order in which to perform the set of configuration actions after utilizing the AI module.

In some implementations, the system configuration platform may generate an execution script in a manner that is the same as or similar to that described with regard to FIGS. 1A-1C. For example, the system configuration platform may generate an execution script based on the column headers and/or the row headers included in the configuration data.

As further shown in FIG. 4, process 400 may include performing the set of configuration actions in the order after generating the execution script (block 460). For example, the system configuration platform (e.g., using a configuration component, computing resource 234, processor 320, output component 360, communication interface 370, and/or the like) may perform the set of configuration actions in the order after generating the execution script.

In some implementations, the system configuration platform may perform the set of configuration actions in a manner that is the same as or similar to that described with regard to FIGS. 1A-1C. For example, the system configuration platform may configure the system with the configuration data.

Process 400 may include additional implementations, such as any single implementation or any combination of implementations described below.

In some implementations, the configuration data may be in a human-readable form. In some implementations, the AI module may be associated with translating the configuration data from the human-readable form to a computer-readable form. In some implementations, the set of configuration actions may cause the system to be configured with the configuration data. In some implementations, the configuration data may be in a format that includes attribute headers for various attributes included in the configuration data. In some implementations, the configuration data may be used to configure a system. In some implementations, the configuration data may in a tabular format. In some implementations, attribute headers of the configuration data may be column headers or row headers of the tabular format. In some implementations, the category data may be included in attribute headers of the configuration data.

In some implementations, the system configuration platform may process the attribute headers of the configuration data to identify the various attributes as the category data. In some implementations, the system configuration platform may generate the execution script as a JavaScript Object Notation (JSON) file. In some implementations, the execution script may be a JavaScript Object Notation (JSON) file.

In some implementations, the set of configuration actions may be associated with a set of Software, Applications, and Products (SAP) transaction codes (e.g., where the set of SAP transaction codes is associated with the set of terms generated using the natural language processing technique). In some implementations, the system configuration platform may configure a first portion of the system with a first subset of the configuration data, may configure a second portion of the system with a second subset of the configuration data after configuring the first portion of the system with the first subset of the configuration data, may receive, from the system, configuration results after configuring the first portion of the system with the first subset of the configuration data and the second portion of the system with the second subset of the configuration data, and may provide the configuration results, for display, via a client device and a chat bot after receiving the configuration results.

In some implementations, the system configuration platform may provide the execution script to a configuration component associated with the system to facilitate configuration of the system. In some implementations, the system configuration platform may convert the configuration data into a base64 file after receiving the configuration data. In some implementations, the system configuration platform may parse the base64 file for the configuration data into a JavaScript Object Notation (JSON) file after converting the configuration data into the base64 file and prior to processing the configuration data to identify the category data. In some implementations, the system configuration platform may receive the configuration data via a chat bot prior to processing the attribute headers of the configuration data.

In some implementations, the system configuration platform may utilize the AI module to predict a set of Software, Applications, and Products (SAP) transaction codes associated with the set of terms generated using the natural language processing technique prior to utilizing the AI module to predict the set of configuration actions, and may utilize the AI module to predict the set of configuration actions based on the set of SAP transaction codes predicted for the set of terms.

In some implementations, the system configuration platform may confirm identification of the category data in the configuration data by seeking confirmation via a client device after processing the attribute headers to identify the category data (e.g., where the category data is provided for display via a chat bot). In some implementations, the system configuration platform may receive, from the client device and via the chat bot, information identifying a modification to the category data in association with confirming the identification of the category data, and may modify the identification of the category data based on the information identifying the modification to the category data. In some implementations, the system configuration platform may provide the execution script to a configuration component associated with the system to facilitate configuration of the system after generating the execution script.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the system configuration platform can be used to configure hundreds, thousands, or more systems with millions, billions, or more data elements in a manner not previously possible. This reduces or eliminates a need for a human actor to configure a system, thereby conserving resources (e.g., computing resources, processing resources, human capital resources, and/or the like) that would otherwise be consumed performing an inefficient configuration of the system. In addition, this provides a tool that can be used by an individual to configure a set of systems that would otherwise be too large and/or too complex for the individual to configure without using the tool, thereby improving a capability of the individual to configure a set of systems. Further, this reduces an amount of skill needed to configure a system, thereby conserving an amount of time needed to train an individual to configure a system.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, configuration data to be used to configure a system,
        wherein the configuration data is in a human-readable form;
    processing, by the device, the configuration data to identify category data that identifies possible categories of data included in the configuration data after receiving the configuration data;
    processing, by the device and after identifying the category data, the category data using a natural language processing technique to generate a set of terms to be processed using an artificial intelligence module;
    utilizing, by the device, the artificial intelligence module to process the set of terms to predict a set of configuration actions to be performed with respect to the configuration data and to determine an order in which to perform the set of configuration actions,
        wherein the artificial intelligence module is associated with translating the configuration data from the human-readable form to a computer-readable form;
    generating, by the device, an execution script based on the set of configuration actions or the order in which to perform the set of configuration actions after utilizing the artificial intelligence module; and
    performing, by the device, the set of configuration actions in the order after generating the execution script,
        wherein the set of configuration actions causes the system to be configured with the configuration data.

2. The method of claim 1, wherein the configuration data is in a format that includes attribute headers for various attributes included in the configuration data.

3. The method of claim 2, wherein processing the configuration data to identify the category data comprises:
    processing the attribute headers of the configuration data to identify the various attributes as the category data.

4. The method of claim 1, further comprising:
    converting the configuration data into a base64 file after receiving the configuration data.

5. The method of claim 4, further comprising:
    parsing the base64 file for the configuration data into a JavaScript Object Notation (JSON) file after converting the configuration data into the base64 file and prior to processing the configuration data to identify the category data.

6. The method of claim 1, wherein the execution script is a JavaScript Object Notation (JSON) file.

7. The method of claim 1, wherein the set of configuration actions is associated with a set of Software, Applications, and Products (SAP) transaction codes,
    wherein the set of SAP transaction codes is associated with the set of terms generated using the natural language processing technique.

8. A device, comprising:
    one or more memories; and
    one or more processors, communicatively coupled to the one or more memories, to:
        process attribute headers of configuration data to identify category data that identifies possible categories of data included in the configuration data,
            wherein the configuration data is to be used to configure a system,
            wherein the configuration data is in a tabular format,
            wherein the attribute headers are column headers or row headers of the tabular format;
        process the category data, after identifying the category data, using a natural language processing technique to generate a set of terms to be processed using an artificial intelligence module;
        utilize the artificial intelligence module to process the set of terms to predict a set of configuration actions to be performed with respect to the configuration data and to determine an order in which to perform the set of configuration actions;
        generate an execution script based on the set of configuration actions or the order in which to perform the set of configuration actions after utilizing the artificial intelligence module; and
        perform the set of configuration actions in the order after generating the execution script,
            wherein the set of configuration actions causes the system to be configured with the configuration data.

9. The device of claim 8, wherein the one or more processors are further to:
    receive the configuration data via a chat bot prior to processing the attribute headers of the configuration data.

10. The device of claim 8, wherein the one or more processors, when performing the set of configuration actions, are to:
    provide the execution script to a configuration component associated with the system to facilitate configuration of the system.

11. The device of claim 8, wherein the one or more processors are further to:
    utilize the artificial intelligence module to predict a set of Software, Applications, and Products (SAP) transaction codes associated with the set of terms generated using the natural language processing technique prior to utilizing the artificial intelligence module to predict the set of configuration actions; and wherein the one or more processors, when utilizing the artificial intelligence module to predict the set of configuration actions, are to:
utilize the artificial intelligence module to predict the set of configuration actions based on the set of SAP transaction codes predicted for the set of terms.

12. The device of claim 8, wherein the one or more processors, when performing the set of configuration actions, are to:
configure a first portion of the system with a first subset of the configuration data;
configure a second portion of the system with a second subset of the configuration data after configuring the first portion of the system with the first subset of the configuration data; and
wherein the one or more processors are further to:
receive a set of configuration results from the system after configuring the first portion of the system with the first subset of the configuration data and the second portion of the system with the second subset of the configuration data; and
provide the set of configuration results, for display via a client device, after receiving the set of configuration results.

13. The device of claim 8, wherein the one or more processors are further to:
confirm identification of the category data in the configuration data by seeking confirmation via a client device after processing the attribute headers to identify the category data,
wherein the category data is provided for display via a chat bot.

14. The device of claim 13, wherein the one or more processors are further to:
receive, from the client device and via the chat bot, information identifying a modification to the category data in association with confirming the identification of the category data; and
modify the identification of the category data based on the information identifying the modification to the category data.

15. A non-transitory computer-readable medium storing instructions, the instructions comprising:
one or more instructions that, when executed by one or more processors, cause the one or more processors to:
process configuration data to identify category data that identifies possible categories of data included in the configuration data,
wherein the configuration data is to be used to configure a system;
process the category data, after identifying the category data, using a natural language processing technique to generate a set of terms to be processed using an artificial intelligence module;
utilize the artificial intelligence module to process the set of terms to predict a set of configuration actions to be performed with respect to the configuration data and to determine an order in which to perform the set of configuration actions,
wherein the artificial intelligence module is associated with translating the configuration data into a computer-readable form;
generate an execution script based on the set of configuration actions or the order in which to perform the set of configuration actions after utilizing the artificial intelligence module; and
perform the set of configuration actions in the order after generating the execution script,
wherein the set of configuration actions causes the system to be configured with the configuration data.

16. The non-transitory computer-readable medium of claim 15, wherein the one or more instructions, when executed by the one or more processors, further cause the one or more processors to:
receive the configuration data from a client device prior to processing the configuration data to identify the category data.

17. The non-transitory computer-readable medium of claim 15, wherein the one or more instructions, when executed by the one or more processors, further cause the one or more processors to:
provide the execution script to a configuration component associated with the system to facilitate configuration of the system after generating the execution script.

18. The non-transitory computer-readable medium of claim 15, wherein the one or more instructions, that cause the one or more processors to perform the set of configuration actions, cause the one or more processors to:
configure a first portion of the system with a first subset of the configuration data;
configure a second portion of the system with a second subset of the configuration data after configuring the first portion of the system with the first subset of the configuration data; and
wherein the one or more instructions, when executed by the one or more processors, further cause the one or more processors to:
receive, from the system, configuration results after configuring the first portion of the system with the first subset of the configuration data and the second portion of the system with the second subset of the configuration data; and
provide the configuration results, for display, via a client device and a chat bot after receiving the configuration results.

19. The non-transitory computer-readable medium of claim 15, wherein the one or more instructions, that cause the one or more processors to generate the execution script, cause the one or more processors to:
generate the execution script as a JavaScript Object Notation (JSON) file.

20. The non-transitory computer-readable medium of claim 15, wherein the category data is included in attribute headers of the configuration data.

* * * * *